(12) United States Patent
Schmitt et al.

(10) Patent No.: US 8,345,656 B2
(45) Date of Patent: Jan. 1, 2013

(54) RECALCULATING AIRTIME QUOTA IN WLAN TO USE UP BANDWIDTH

(75) Inventors: Ruediger Schmitt, Maplewood, NJ (US); Richard Chen, Croton-On-Hudson, NY (US)

(73) Assignee: Koninklijke Philips Electronics N.N., Eindhoven (NL)

( * ) Notice: Subject to any disclaimer, the term of this patent is extended or adjusted under 35 U.S.C. 154(b) by 410 days.

(21) Appl. No.: 12/522,947

(22) PCT Filed: Jan. 14, 2008

(86) PCT No.: PCT/IB2008/050109
§ 371 (c)(1),
(2), (4) Date: Jul. 13, 2009

(87) PCT Pub. No.: WO2008/090486
PCT Pub. Date: Jul. 31, 2008

(65) Prior Publication Data
US 2010/0111056 A1 May 6, 2010

Related U.S. Application Data

(60) Provisional application No. 60/885,928, filed on Jan. 22, 2007.

(51) Int. Cl.
*H04J 3/00* (2006.01)
*H04B 7/212* (2006.01)
(52) U.S. Cl. .......................... 370/345; 370/336; 370/348
(58) Field of Classification Search ................... 370/348
See application file for complete search history.

(56) References Cited

U.S. PATENT DOCUMENTS

| 6,973,315 | B1 | 12/2005 | Miernik | |
|---|---|---|---|---|
| 7,746,861 | B2 * | 6/2010 | Nishibayashi et al. | ....... 370/392 |
| 2004/0037247 | A1 | 2/2004 | Ngo | |
| 2007/0019591 | A1 | 1/2007 | Chou | |
| 2007/0025289 | A1 | 2/2007 | Nandagopalan | |

FOREIGN PATENT DOCUMENTS

| EP | 0901301 A2 | 10/1999 |
|---|---|---|
| EP | 0977405 A1 | 2/2000 |
| WO | WO2005011199 A2 | 2/2005 |
| WO | WO2005011307 A2 | 2/2005 |

(Continued)

OTHER PUBLICATIONS

Pierre Ansel, Qiang Ni, Thierry Turletti("An Efficient Scheduling Scheme for IEEE 802.11e", in Proc Modeling and Optimization in Mobile Ad (2004).*

(Continued)

*Primary Examiner* — Derrick Ferris
*Assistant Examiner* — Kodzovi Acolatse
(74) *Attorney, Agent, or Firm* — Larry Liberchuk

(57) ABSTRACT

In a wireless communication channel, the time per a service interval is distributed among multiple data services. The data services have been allocated airtime quotas in order to comply with their QoS requirements. These airtime quotas are scaled by a factor that is the ratio between, on the one hand, the time available per service interval for accommodating data of these services and, on the other hand, the total of the airtime quotas. This allows the services to use more airtime in case not the entire service interval has been allocated.

9 Claims, 2 Drawing Sheets

FOREIGN PATENT DOCUMENTS

| | | |
|---|---|---|
| WO | WO2005125124 A1 | 12/2005 |
| WO | WO2006077522 A1 | 7/2006 |

OTHER PUBLICATIONS

Cisco ("Comparing the bandwidth and priority Commands of a QoS Service Policy", http://www.cisco.com/en/US/tech/tk543/tk757/technologies_tech_note09186a0080103eae.shtml, Updated Apr. 19, 2005).*

Pierre Ansel et al., "An Efficient Scheduling Scheme for IEEE 802.11e", Proceeding of IEEE Workshop on Modeling and Optimization in Mobile, Ad Hoc ad Wireless Networks (WiOpt 2004), Cambridge, UK, Mar. 2004.

M Van Der Schaar et al., "Cross-Layer Multimedia Transmission: Challenges, Principles and New Paradigms", IEEE Wireless Communications, vol. 12 (4), Aug. 2005, pp. 50-58.

* cited by examiner

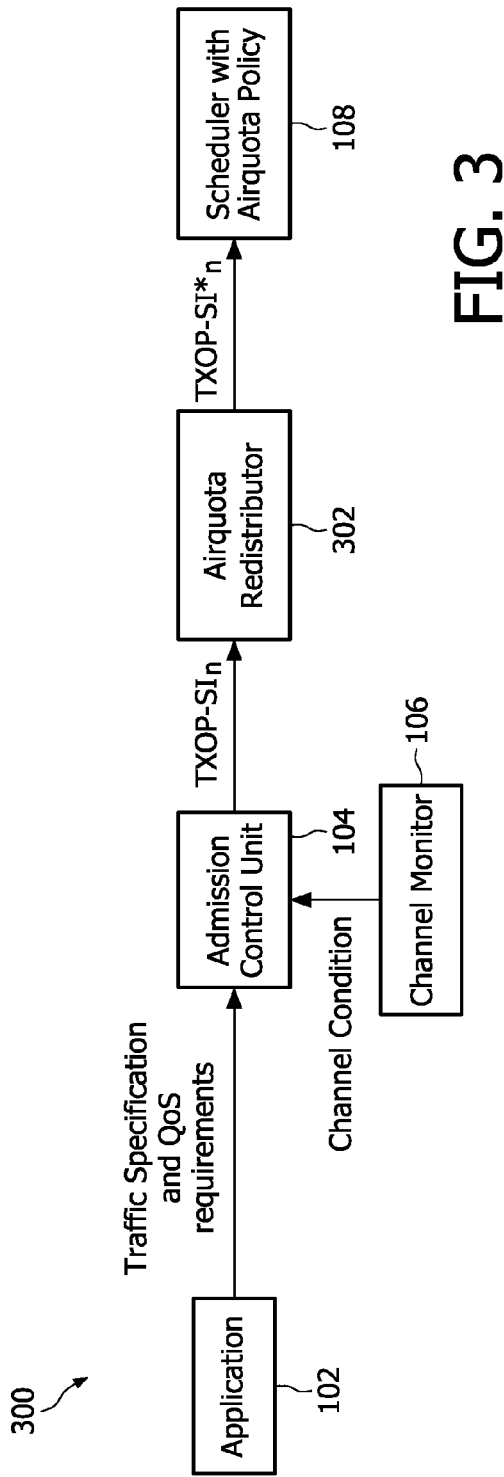

RECALCULATING AIRTIME QUOTA IN WLAN TO USE UP BANDWIDTH

FIELD OF THE INVENTION

The invention relates to a system and method for delivery of data for multiple data services, e.g. multiple data streams. The invention further relates to software for control of such a system or method.

BACKGROUND ART

As wireless local area networks (WLANs) are becoming ubiquitous, there is an increased demand in multimedia transmissions for both professional and personal uses. Multimedia applications are sensitive to delays and losses and require special Quality of Service (QoS) support in order to provide a satisfying user experience. The 802.11e standard addresses these needs by providing a framework for centralized scheduling and admission control algorithms, please see, e.g., WO2005/011307. The scheduling and admission control algorithms themselves are not standardized, but vendor dependent. Special scheduling algorithms for WLANs have been developed, which take into account the characteristics of WLANs, such as time-varying channels, multiple transmission rates, location-dependent errors as a result of the mobility of the users of the WLAN, and interference from neighboring WLANs.

The Air Fair Scheduling algorithm and its related admission control algorithm prevent streams which experience increased number of retransmissions or reduction in physical transmission rate (PHY-rate), due to worsening link quality, from affecting the QoS of streams whose link quality has not changed. For the Air Fair Scheduling algorithm, please see, e.g., the discussion of time-fairness and of TF-WFQ (time fair-weighted fair queuing) in WO2005/125124 (PHUS040231) or "Cross-Layer Wireless Multimedia Transmission: Challenges, Principles and New Paradigms", M. van der Schaar and N. Sai Shankar, IEEE Wireless Communications, Vol. 12(4), Aug. 2005, pp 50-58. For the related admission control algorithm, please see, e.g., WO2005/011307.

The admission control algorithm, executed in the admission control unit (ACU), decides whether or not the scheduler can accommodate a stream based on, among other things, the stream's traffic characteristics (mean data rate and peak data rate, burst size, average packets size), the minimum PHY-rate, the maximum delay bound and the available resources of the scheduler. More specifically the ACU calculates the airtime quota needed by a particular stream in order to satisfy its QoS requirements.

An airtime policing module (APM) as presented in WO2006/077522, monitors and enforces the airtime allocated to outgoing streams of a station and thus completes the Air Fair Scheduling algorithm.

As specified in WO2006/077522, the airtime quota is policed at the granularity of a Service Interval (SI), such that the airtime used by a stream (referred to as an "admitted stream") during each SI does not exceed the allocated transmission opportunity (TXOP-SI). The APM strictly enforces the TXOP-SI allocated for a particular stream.

WO2005/125124 relates to sharing a communications channel in wireless communications, and in particular to allocation of time to devices that communicate under a protocol such as 802.11e. The Time Fairness concept is utilized with an algorithm that specifies a way to distribute the time allocation in such a way that the delay requirements of all streams are not violated. Streams are prioritized based on highest ratio of, on the one hand, time remaining to be allocated to a stream in a service period and, on the other, the time remaining before the service period elapses.

U.S. Pat. No. 6,973,315 relates to a method and system for sharing over-allocated bandwidth between different classes of service in a wireless network. Traffic is transmitted for a first service class in excess of bandwidth allocated to the first service class, using unused bandwidth allocated to a second class. After transmitting traffic for the first service class in excess of bandwidth allocated to the first service class using unused bandwidth allocated to a second class, traffic for a third service class is transmitted in unused bandwidth remaining in the second service class.

In digital systems, the term "bandwidth" is being used to refer to "baud" i.e., the rate at which symbols may be transmitted through the system, or to refer to the channel capacity, i.e., the rate at which bits may be transmitted through the system.

SUMMARY OF THE INVENTION

The approach in U.S. Pat. No. 6,973,315 requires that priorities be assigned to the streams and data traffic service classes, so that unused bandwidth is consecutively allocated to the service classes starting with the class of the highest priority.

The inventors now provide an alternative to the known solution of allocating unused bandwidth. The invention is based on the insight that unused bandwidth can be used efficiently by allocating airtime quota more liberally and in a fairer manner to all data traffic. To this end, the inventors propose a system for delivery of data for multiple data services. The system comprises first means, e.g., an admission control unit, for determining a respective first quota per service time interval for accommodating the data for each respective one of the multiple data services to comply with a respective quality of service requirement associated with the respective data service. The system comprises a second means for determining for each respective data service a respective second quota per service time interval. The respective second quota is proportional to the respective first quota. Further, the respective second quota is proportional to the ratio between, on the one hand, a portion of the service time interval available for accommodating the data of the multiple data services and, on the other hand, the aggregate of the first quotas of the multiple data services. The system also comprises third means, e.g., a scheduler, for scheduling the delivery of the data per service time interval for each respective data service under control of the respective second quota, if the ratio is larger than unity.

If the ratio has a value larger than unity, then this indicates that the service interval is not completely being used by the services. A recalculation of the originally allocated quotas in accordance with the invention provides the services with more liberal quotas without compromising the QoS requirements.

The system of the invention can be implemented in hardware, wherein the first, second and first means each comprise dedicated hardware modules, e.g., an admission control circuit and a scheduling circuit. Alternatively, the system can be implemented in software, wherein the first, second and third means each comprise software modules for being processed on a data processing system.

The invention is especially relevant in case each respective one of the multiple data services comprises a respective data stream, owing to the real-time aspects of streaming and stringent QoS requirements. The approach of the invention is in particular advantageous in a wireless data network operating under the 802.11e standard.

In an embodiment of the invention, a first one and second one of the multiple data services comprise a first data stream and a second data stream, respectively, and a third one of the multiple data services comprises a best-effort data delivery service. The QoS of a best-effort service does not specify a guarantee or a reservation of resources. Allocation of airtime quota to best-effort data traffic does not need to take into account stringent requirements, if any. In the invention, however, one could treat the best-effort service in the same way as the streaming services, and calculate a new quota for the best-effort service as well as for the streaming services, based on the length of the service interval. Alternatively, one could reserve a fixed quota for the best-effort service(s) and calculate the new quotas for the streaming services based on the length of the service interval minus the fixed quota for the best-effort service(s).

The invention also relates to a method of delivering data for multiple data services. The method comprises determining a respective first quota per service time interval for accommodating the data for each respective one of the multiple data services in order to comply with a respective quality of service, if required for the respective data service. The method comprises determining for each respective data service a respective second quota per service time interval. The respective second quota is proportional to the respective first quota. The respective second quota is also proportional to the ratio between, on the one hand, a portion of the service time interval available for accommodating the data of the multiple data services and, on the other hand, the aggregate of the first quotas of the multiple data services. The method further comprises scheduling the delivery of the data per service time interval for each respective data service under control of the respective second quota if the ratio is larger than unity.

BRIEF DESCRIPTION OF THE DRAWING

The invention is explained in further detail, by way of example and with reference to the accompanying drawing, wherein:

FIG. 3 is a block diagram of an airtime scheduling system in the invention; and

FIG. 4 gives mathematical formulae illustrating the recalculating of the airtime quota.

Throughout the Figures, similar or corresponding features are indicated by same reference numerals.

DETAILED EMBODIMENTS

The invention is discussed below within the context of IEEE 802.11e, but can be equally well applicable to, e.g., DECT, Bluetooth, wireless Ethernet, etc., or even wired data communication.

Figure 1:
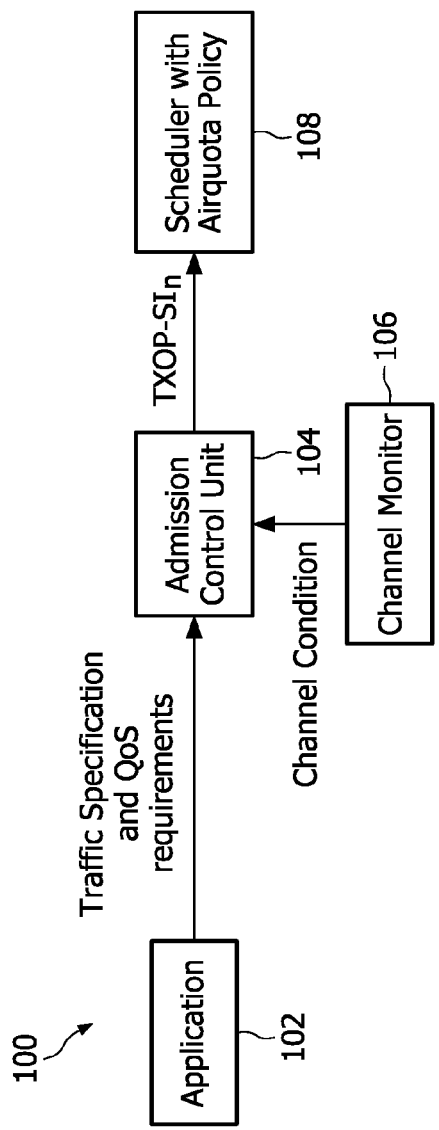
FIG. 1 is a block diagram of a known airtime scheduling system.

FIG. 1 is a block diagram of a known airtime scheduling system 100 in a wireless network environment wherein multiple nodes share access to the communication medium (colloquially referred to as "air" in a "wireless" context) or communication channel. System 100 comprises a running software application 102 at a particular node, an admission control unit (ACU) 104, a channel monitor 106 and a scheduler 108.

Application 102 supplies to ACU 104 a specification of the traffic stream data and the required QoS. In the IEEE 802.11e standard, the traffic stream data required by an admission control algorithm is referred to as "Traffic Specification" or TSPEC. It consists of a number of parameters. Some of these are specified by the Media Access Control (MAC) mechanisms designed to enable an efficient sharing of the communication medium between the nodes. Others among the parameters depend on the requirements of application 102 or of the user. Still others among these parameters are strictly characteristic of the traffic stream itself. The parameters of the first two categories can be readily determined. The parameters of the last category must be determined from the actual content of the traffic stream, or else must either be estimated or set at a standard value based on at least one of the specific application and the type of the stream. The concept "QoS" is well known in the art. The QoS typically relates to the cumulative effect on user satisfaction of factors affecting the service, e.g., guaranteed delay, jitter, bandwidth, response time, interrupts, noise, cross-talk, loudness levels, frequency response, noticeable echos, etc. The QoS typically comprises any suitable service level information that identifies parameters representing required limits or levels for the data connection.

ACU 104 uses an admission control algorithm to operate on the TSPEC parameters for computing a Transmission Opportunity (TXOP). The TXOP corresponds to the amount of network bandwidth to be allocated to the particular traffic stream from application 102. The TXOP is passed on to scheduler 108. ACU 104 decides whether or not scheduler 108 can accommodate a stream based on, among other things, the stream's traffic characteristics (mean data rate and peak data rate, burst size, average packets size), the minimum PHY-rate, the maximum delay bound and the available resources of scheduler 108. More specifically, ACU 104 calculates the airtime quota needed by a particular stream in order to satisfy its QoS requirements. This ensures that admittance of a new stream does not violate the parameterized service so that the QoS can be guaranteed. Channel monitor 106 is operative to monitor the data traffic in the communication channel so as to identify the data traffic's and channel's quality characteristics relevant to the operation of ACU 104.

As specified in WO2006/077522, the airtime quota is policed, here by scheduler 108, at the granularity of a Service Interval (SI), such that the airtime used by a stream during each SI does not exceed the allocated transmission opportunity (TXOP-SI). Scheduler 108 performs the task of airtime quota policing and strictly enforces the TXOP-SI allocated for a particular stream.

Figure 2:
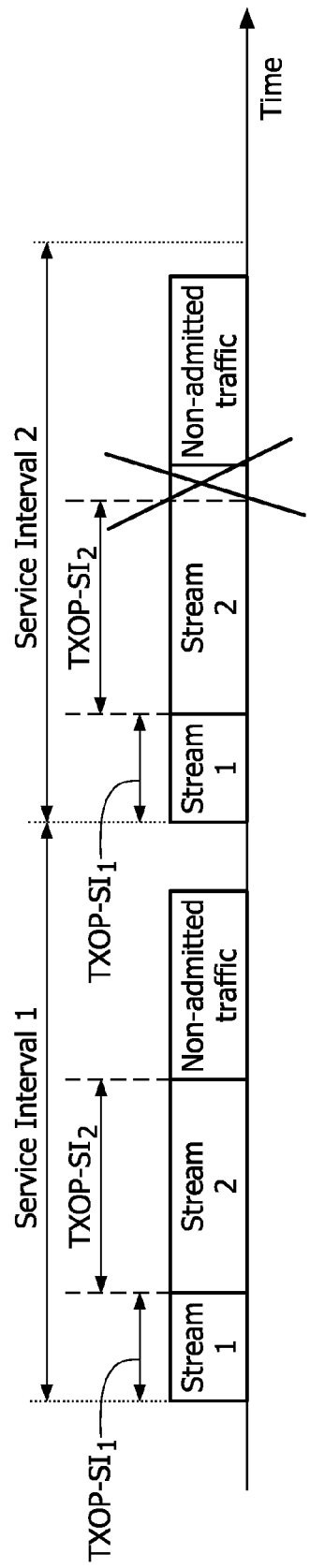
FIG. 2 is a time diagram of allocated transmission opportunities.

FIG. 2 considers the following transmission scenario, where two streams have been admitted, and shows the usage of the communication channel by Stream-1 and Stream-2 admitted by ACU 104. Stream-1 and Stream-2 have respective airtime quotas TXOP-SI$_1$ and TXOP-SI$_2$. Stream-1 and Stream-2 are policed by an airtime policing module (not shown) accommodated in scheduler 108 for monitoring and enforcing the airtime allocated to the streams. FIG. 2 shows quotas TXOP-SI$_1$ and TXOP-SI$_2$ as consecutive time intervals per SI. Note that Stream-1 and Stream-2 could also be interleaved. The TXOP-SI$_1$ and TXOP-SI$_2$ intervals are therefore merely meant to illustrate the principle of operation. During SI-1, Stream-1 and Stream-2 use exactly the airtime quota allocated to them, i.e. both streams are not prevented by scheduler 108 from sending all their data during SI-1. The remaining time in SI-1 can be used for other data services that have not been admitted via ACU 104 (the "non-admitted traffic"). For example, this other data traffic could be accommodated in SI-1 as a data delivery service based on best-effort. As known, a best-effort service relies on the resources when they become available, without guarantee or reservation of those resources.

The invention addresses a problem occurring in SI-2 as shown in FIG. 2. Due to the time-varying nature of the wireless channel and location-dependent errors, the probability of transmission errors and, consequently, the number of retransmissions can only be estimated, see e.g., WO2005/011307. Therefore, calculated airtime quota TXOP-$SI_1$ and TXOP-$SI_2$, which take the transmission errors into account, can only be estimates. At times, one or more of the streams may need more airtime than they have been allocated. In SI-2, Stream-2 needs more airtime than the allocated TXOP-$SI_2$, but is unable to send all of its data due to the strict airtime quota enforcement by scheduler 108. Since the network is not working at full capacity, i.e., since SI-1 and SI-2 are not being fully used, Stream-2 would have been able to transmit all of its data during SI-2 without violating the airtime allocated to Stream-1.

In airtime scheduling system 100, strict enforcement of airtime quotas in an SI can lead to inefficient use of the communication channel and to service degradation for multimedia streams. The inventors now propose to distribute the time in an SI between all admitted streams and (optionally) other data delivery services such as best-effort delivery, in proportion to the original airtime quotas calculated by ACU 104. This allows the streams to use more airtime in case not the entire SI has been allocated, i.e., in case the total of the originally allocated airtimes is less the length of the SI.

FIG. 3 is a block diagram of an airtime scheduling system 300 in the invention. System 300 comprises the functionalities discussed with respect to system 100 of FIG. 1. In addition, system 300 comprises an airtime quota redistributing module 302, interposed between ACU 104 and scheduler 108. Redistributing module 302 scales the airtime quota determined by ACU 104 by a scaling factor that is representative of the ratio between a portion of the length of the SI that is available for accommodating the streams, and the total of the airtime quota originally calculated by ACU 104. If this ratio is larger than unity, then the scaling leads to a more liberal allocation of airtime per individual stream admitted. The redistribution algorithm is executed whenever a new stream has been admitted by ACU 104 or an active stream has been de-admitted by ACU 104. A usage scenario would be a video streaming session, wherein the media stream itself goes through the admission control process of ACU 104 and the out-of-band control information falls under the best-effort category. The actual amount of airtime reserved for best-effort traffic can be arbitrary. Preferably, a certain amount of airtime is reserved for best-effort data traffic to prevent it from being starved.

FIG. 4 gives mathematical formulae 402 and 404 that represent first and second scenarios for implementing the invention. Each scenario treats the best-effort data service in a different manner.

First scenario 402 treats the airtime quota allocation of best-effort data traffic, TXOP-$SI_{be}$, in the same manner as the airtime quota allocation of an admitted stream, TXOP-$SI_n$, wherein the subscript "n" is used to identify the relevant one of multiple streams. According to formulae 402, the new airtime quota for stream "n", TXOP-$SI_{sum}$, is proportional to originally calculated airtime quota for admitted stream "n", TXOP-$SI_n$, and to a factor that consist of the ratio between the length of the SI, on the one hand, and the sum of the originally calculated airtime quota of all admitted streams, TXOP-$SI_{sum}$, plus the originally calculated airtime quota for best-effort traffic, TXOP-$SI_{be}$, on the other hand. Similarly, the new airtime quota for best-effort traffic, TXOP-$SI*_{be}$, is proportional to originally calculated airtime quota for best-effort traffic, TXOP-$SI_{be}$, and to the same factor that signifies the ratio between what is available, on the one hand, and what is needed to comply with QoS, on the other.

Second scenario 404 treats the airtime quota for best-effort traffic, $SI_{be}$, as a constant. The new airtime quota for stream "n", TXOP-$SI*_n$, is proportional to originally calculated airtime quota for admitted stream "n", TXOP-$SI_n$, and to a factor that is the ratio between, on the one hand, the portion of the SI available for the admitted streams after allocating the best-effort traffic and, on the other hand, the sum of the originally calculated airtime quota of all admitted streams, TXOP-$SI_{sum}$, needed to comply with the QoS of each admitted stream.

First and second scenarios 402 and 404 are illustrated by following examples, wherein the length of an SI is 10 time units. Consider admitted Stream-1 and Stream-2, whose original airtime quotas have been determined as 2 time units and 3 time units, respectively, in order to comply with their respective QoS requirements. Also consider an original airtime quota of 1 time unit for best-effort data traffic. The total of the original airtime quotas is 6 time units, which is smaller than the 10 time units of the SI.

In first scenario 402, Stream-1 is allocated a new airtime quota of 3.3 time units, Stream-2 is allocated a new airtime quota of 5 time units, and best-effort traffic is allocated a new airtime quota of 1.6 time units. Accordingly, the two streaming services and the best-effort service can all be accommodated in the SI with more liberal airtime quota.

In second scenario 404, Stream-1 is allocated a new airtime quota of 3.6 time units, Stream-2 is allocated a new airtime quota of 5.4 time units, whereas best-effort traffic keeps its originally allocated airtime quota of 1 time unit. Again, the two streaming services and best-effort service can be accommodated in the SI, the two streaming services now being allocated more liberal airtime quotas.

The invention can be used in the applications with wireless transmitters, such as in the Streamium product line of Philips Electronics, home wireless gateways, home wireless routers, wireless media nodes, wireless entertainment hubs, wireless DVS blasters, wireless VoIP (voice over IP) devices, wireless monitors, etc.

The scheduled data delivery process, as described above, can be executed on a general-purpose computer under control of software on a computer-readable medium, or by means of a dedicated processor, and may alternatively be embodied in hardware or firmware.

Although in particular advantageous to wireless data communication, the invention can also be applied to wired data communication wherein multiple data services share the same communication channel or communication medium.

The invention claimed is:

1. A system for delivery of data of multiple data services, comprising:
   an admission control unit for determining a respective first quota per service time interval for accommodating the data for each respective one of the multiple data services to comply with a respective quality of service requirement associated with the respective data service;
   an airtime quota redistributing unit for determining for each respective data service a respective second quota per service time interval;

the respective second quota is proportional to the respective first quota; and the respective second quota is proportional to the ratio between the service time interval available for accommodating the data of the multiple data services and the aggregate of the first quotas of the multiple data services; and a scheduler for scheduling the delivery of the data per service time interval for each respective data service under control of the respective second quota, if the ratio is larger than unity.

2. The system of claim 1, wherein each respective one of the multiple data services comprises a respective data stream.

3. The system of claim 1, wherein a first one and a second one of the multiple data services comprise a first data stream and a second data stream, respectively, and wherein a third one of the multiple data services comprises a best-effort data delivery service.

4. A method of delivering data of multiple data services, the method comprises:

determining by a device, a respective first quota per service time interval for accommodating the data for each respective one of the multiple data services for complying with a respective quality of service requirement associated with the respective data service;

determining for each respective data service a respective second quota per service time interval;

the respective second quota is proportional to the respective first quota; and the respective second quota is proportional to the ratio between a portion of the service time interval available for accommodating the data of the multiple data services and the aggregate of the first quotas of the multiple data services; and scheduling the delivery of the data per service time interval for each respective data service under control of the respective second quota if the ratio is larger than unity.

5. The method of claim 4, wherein each respective one of the multiple data services comprises a respective data stream.

6. The method of claim 4, wherein a first one and a second one of the multiple data services comprise a first data stream and a second data stream, respectively, and wherein a third one of the multiple data services comprises a best-effort data delivery service.

7. A non-transitory computer readable medium containing software for control of a delivery of data for multiple data services, which, when the software is executed on a processor, causes the processor to:

determine a respective first quota per service time interval for accommodating the data for each respective one of the multiple data services for complying with a respective quality of service requirement associated with the respective data service;

determine for each respective data service a respective second quota per service time interval; the respective second quota is proportional to the respective first quota; and the respective second quota is proportional to the ratio between a portion of the service time interval available for accommodating the data of the multiple data services and the aggregate of the first quotas of the multiple data services; and schedule the delivery of the data per service time interval for each respective data service under control of the respective second quota, if the ratio is larger than unity.

8. The non-transitory computer readable medium of claim 7, wherein each respective one of the multiple data services comprises a respective data stream.

9. The non-transitory computer readable medium of claim 7, wherein a first one and a second one of the multiple data services comprise a first data stream and a second data stream, respectively, and wherein a third one of the multiple data services comprises a best-effort data delivery service.

* * * * *